(12) United States Patent
Egelkraut et al.

(10) Patent No.: US 11,643,235 B2
(45) Date of Patent: May 9, 2023

(54) DEEP-DRAWING APPARATUS, PACKAGING MACHINE HAVING A DEEP-DRAWING APPARATUS AND METHOD FOR OPERATING THE DEEP-DRAWING APPARATUS

(71) Applicant: Harro Hoefliger Verpackungsmaschinen GmbH, Allmersbach im Tal (DE)

(72) Inventors: Udo Egelkraut, Allmersbach im Tal (DE); Jan Schneider, Allmersbach im Tal (DE); Andreas Thienst, Allmersbach im Tal (DE)

(73) Assignee: Harro Hoefliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 17/190,971

(22) Filed: Mar. 3, 2021

(65) Prior Publication Data
US 2021/0276754 A1    Sep. 9, 2021

(30) Foreign Application Priority Data
Mar. 6, 2020 (EP) ..................... 20161489

(51) Int. Cl.
*B65B 47/10* (2006.01)
*B29C 51/08* (2006.01)
(Continued)

(52) U.S. Cl.
CPC .............. *B65B 47/10* (2013.01); *B29C 51/08* (2013.01); *B29C 51/10* (2013.01); *B29C 51/261* (2013.01); *B65B 3/022* (2013.01); *B65B 3/04* (2013.01); *B65B 51/10* (2013.01); *B29L 2031/712* (2013.01)

(58) Field of Classification Search
USPC ........................................... 53/561
See application file for complete search history.

(56) References Cited

U.S. PATENT DOCUMENTS 3,129,545 A * 4/1964 Sloan ................ B65B 47/10
                                                    53/553
4,308,005 A * 12/1981 Zundel ............ B29C 51/261
                                                   425/304
(Continued)

FOREIGN PATENT DOCUMENTS

EP           3390234        10/2018

*Primary Examiner* — Chinyere J Rushing-Tucker
(74) *Attorney, Agent, or Firm* — Walter Ottesen, P.A.

(57) ABSTRACT

The disclosure relates to a deep-drawing apparatus for deep-drawing a continuously fed film web, an associated packaging machine, and a corresponding method. A cyclically sequenced forming station, which runs along from a start position to an end position and runs back from there to the start position is provided, wherein individual format plates are sequentially firstly connected up to a forming vacuum device and then with a following holding vacuum channel. The forming vacuum device is part of the cyclically moved forming station. The holding vacuum channel includes two interlocking telescopic channel portions, a first telescopic channel portion being part of the cyclically moved forming station, and a second telescopic channel portion being mounted statically relative to the fixed machine frame.

7 Claims, 5 Drawing Sheets

(51) Int. Cl.
*B29C 51/10* (2006.01)
*B29C 51/26* (2006.01)
*B65B 3/02* (2006.01)
*B65B 3/04* (2006.01)
*B65B 51/10* (2006.01)
*B29L 31/00* (2006.01)

(56) References Cited

U.S. PATENT DOCUMENTS

| | | |
|---|---|---|
| 4,883,419 A | 11/1989 | Queirel |
| 7,451,952 B2 * | 11/2008 | Eck ................. B29C 51/261 |
| | | 264/320 |
| 7,833,002 B2 * | 11/2010 | Buchko ................. B65B 41/14 |
| | | 425/383 |
| 2004/0000128 A1 | 1/2004 | Di Lauretis et al. |

* cited by examiner

DEEP-DRAWING APPARATUS, PACKAGING MACHINE HAVING A DEEP-DRAWING APPARATUS AND METHOD FOR OPERATING THE DEEP-DRAWING APPARATUS

CROSS REFERENCE TO RELATED APPLICATION

This application claims priority of European patent application no. 20 161 489.8, filed Mar. 6, 2020, the entire content of which is incorporated herein by reference.

FIELD OF THE INVENTION

The disclosure relates to a deep-drawing apparatus, a packaging machine for producing filled bags with such a deep-drawing apparatus, and a method for operating the deep-drawing apparatus.

BACKGROUND OF THE INVENTION

In a widely used embodiment, packaging units are frequently produced by films being firstly deep-drawn. A product is poured into the cavities here formed, after which a sealing with a cover film is realized. A double-layered film web is formed, in which part-quantities of the product are demarcated from one another. These part-quantities are finally separated in a cutting station.

In particular in the household sector, single doses of detergent or rinsing agent are packed in the abovementioned manner via two webs of water-soluble film. For industrial mass production, packaging machines are employed in a continuous, non-sequenced operation. In this, a conveyor, for instance, in the form of a chain, revolves continuously around a fixed machine frame, wherein the conveyor, on the upper processing side, covers a rectilinear, horizontal travel path. So-called format plates are moved jointly, as one with the conveyor, in a continuously revolving motion. Synchronously with the movement of the format plates, a first film web is fed continuously and placed onto the top side of the format plates. In the format plates are shaped a plurality of mold impressions, which play a central role for the deep-drawing process and also for the filling process.

In a previously known construction, a deep-drawing apparatus having a forming station is employed, which forming station, only over a part-section, moves synchronously along with the respective format plate from a start position to an end position and is then transported cyclically back again to the start position. At the same time, the transport of the format plates and of the film web continues to be maintained. During the joint running from the start position to the end position, the film web is firstly heated to such a temperature that it is able to be plastically deformed. The in this way deformable film is now deep-drawn into the mold impressions via an applied forming vacuum. After the deep-drawing, the molding station travels back to its start position in order there to heat up the next portion of the film web and deep-draw it into the mold impressions of a following format plate.

Following completion of the deep-drawing process, it must be ensured that the film remains in the mold impressions in order to be able to receive in sufficient quantity the charge which is later to be poured in. In the subsequent sealing process too, it is important that the lower film web and the poured-in part-quantities of the product remain in place in order to be able to obtain a clean and leak-tight sealed seam. Generally, the mold impressions, subsequent to the deep-drawing process, are therefore subjected to a holding vacuum, which holds the film web in its deep-drawn shape.

In order to achieve this, two-part apparatuses for providing a vacuum are known. A first part, namely a positionally fixed forming vacuum device, is located where the deep-drawing process takes place. Following this in the motional direction is found, likewise in static arrangement, the second part in the form of a holding vacuum device. In their continuous movement, the format plates slide over both parts and, via appropriate channel connections, are sequentially brought firstly into connection with the forming vacuum device and then with the holding vacuum device. It is hereby possible to firstly subject the mold impressions to a forming vacuum and subsequently, independently thereof, to a lower, though still sufficiently high, holding vacuum.

In practical operation, some difficulties have to be overcome. Due to the sliding relative movement of the format plates relative to the vacuum devices, appropriate sealing means must be provided. Despite the high technical complexity, at the sealing points appreciable flow losses cannot be avoided. The adjustment and maintenance of a desired underpressure level is difficult. Also the transfer from the forming vacuum device to the holding vacuum device with a continuous underpressure pattern proves difficult. In particular, the productivity of the overall plant remains limited by the fact that film can always only be deep-drawn into the mold impressions of a single format plate. For the simultaneous deep-drawing into two or more successive format plates, still no viable solution has been able to be found in terms of the vacuum management.

SUMMARY OF THE INVENTION

It is an object of the invention to refine a deep-drawing apparatus such that an improved vacuum management is achieved. This object can, for example, be achieved by a deep-drawing apparatus for deep-drawing a continuously fed film web. The deep-drawing apparatus includes: a conveyor configured to revolve continuously around a fixed machine frame; the conveyor including a plurality of format plates; the plurality of format plates having mold impressions formed therein; a cyclically sequenced forming station, which runs along with the conveyor from a start position to an end position and runs back from the end position to the start position; a forming vacuum device; a holding vacuum channel; individual ones of the plurality of format plates being able to be sequentially connected first to the forming vacuum device and then with the holding vacuum channel; the forming vacuum device being part of the cyclically sequenced forming station; the holding vacuum channel having two interlocking telescopic channel portions including a first telescopic channel portion and a second telescopic channel portion; the first telescopic channel portion being part of the cyclically sequenced forming station; and, the second telescopic channel portion being mounted statically relative to the fixed machine frame.

It is a further object of the invention to improve a packaging machine for producing filled bags in terms of its economic efficiency. This object can, for example, be achieved by a packaging machine for producing filled bags. The packaging machine includes: a deep-drawing apparatus for deep-drawing a continuously fed film web; the deep-drawing apparatus including a conveyor, a cyclically sequenced forming station, a forming vacuum device, and a holding vacuum channel; the conveyor configured to revolve continuously around a fixed machine frame; the conveyor including a plurality of format plates; the format plates having mold impressions formed therein; the cyclically sequenced forming station running along with the conveyor from a start position to an end position and running back from the end position to the start position; individual ones of the plurality of format plates being able to be sequentially connected first to the forming vacuum device and then to the holding vacuum channel; the forming vacuum device being part of the cyclically sequenced forming station; the holding vacuum channel includes a first telescopic channel portion and a second telescopic channel portion; the first telescopic channel portion being part of the cyclically sequenced forming station; the second telescopic channel portion being mounted statically relative to the fixed machine frame; and, a subsequent processing station.

Finally, yet another object of the invention is to define a method for operating the deep-drawing apparatus, which method enables an improved suctioning and holding of the film in the mold cavities. This object is achieved by a method for operating a deep-drawing apparatus. The method includes the steps of: moving a conveyor having a plurality of format plates in a continuously revolving motion around a machine frame; continuously feeding a film web to the format plates synchronously to the movement of the conveyor; synchronizing, at a beginning of a cycle, a forming station in a region of a start position with the movement of one of the plurality of format plates, wherein the forming station then runs along with the format plate; introducing a forming vacuum into mold impressions of the format plate via a forming vacuum device moved jointly as part of the forming station and thus deep-drawing the film web into the mold impressions; at an end of a deep-drawing operation and when an end position is reached, moving the forming station back to the start position, while the conveyor moves onward together with the format plate and the deep-drawn film web, wherein a holding vacuum is introduced into the mold impressions via a first telescopic channel portion of a holding vacuum channel moved jointly with the forming station and thereby holds the deep-drawn film web in the mold impressions; when the start position is reached, synchronizing the forming station with a movement of a following format plate whereby a new cycle begins; and, in a further course of a continuous onward movement of the format plate with the deep-drawn film web, maintaining the holding vacuum in the mold impressions via a second telescopic channel portion, mounted statically relative to the fixed machine frame, of the holding vacuum channel and thereby the deep-drawn film web is held in the mold impressions, wherein the first and second telescopic channel portions are two interlocking channel portions.

According to the disclosure, it is provided that a part of the overall vacuum device is moved cyclically back and forth with the forming station, and that a further part is mounted statically relative to the fixed machine frame, wherein between both parts there exists a telescopic connection. To put it more precisely, there is a forming vacuum device, as well as a following holding vacuum channel. According to the disclosure, the forming vacuum device is part of the cyclically moved forming station and is consequently moved along with this. The holding vacuum channel, by contrast, is of two-part construction and includes two interlocking telescopic channel portions. The first of these two telescopic channel portions is part of the cyclically moved forming station and is hence consequently —just like the forming vacuum device —moved cyclically back and forth with the forming station. The second telescopic channel portion is, for its part, static relative to the fixed machine frame. From this and from the cyclical back-and-forth movement of the forming station, it follows that the first telescopic channel portion, with the maintenance of a permanent pressure transmission, cyclically engages more or less deeply in the fixed second telescopic channel portion.

During operation according to the disclosure, the conveyor is now moved with the format plates so as to revolve continuously around the machine frame, wherein the film web which is later to be deep-drawn is fed to the format plates continuously and synchronously to the movement of the conveyor. At the beginning of a deep-drawing cycle, the forming station is synchronized, in the region of its start position, with the movement of at least one format plate, and then runs along with this format plate. The film which is here plasticized by way of an appropriate heat action is now deep-drawn into the mold impressions of the format plate. This is realized via the forming vacuum device which is moved along with the forming station.

At the end of the deep-drawing process and when the end position is reached, the forming station is moved back to the start position, while the conveyor is continuously moved onward together with the format plate and the deep-drawn film web. Format plate and forming station thus move in opposite directions, so that the format plate now comes into contact with the first telescopic portion of the holding vacuum channel, which first telescopic portion is moved jointly with the forming station. As a result, a holding vacuum is introduced into the mold impressions of the format plate and hence holds the deep-drawn film web in the mold impressions.

When the start position is reached, the forming station is synchronized with the movement of a following format plate, whereby a new cycle begins. The format plate previously processed by the forming station, with the therein already deep-drawn film, meanwhile moves continuously onward until it leaves the first, cyclically moved-along telescopic channel portion and reaches the second, static telescopic channel portion. Since both telescopic channel portions are part of the same holding vacuum channel, the mold impressions and the therein deep-drawn film remain continuously subjected to the same holding vacuum. The holding vacuum acting on the film thus continues to be maintained during the passage from the first to the second telescopic channel portion, so that the film is held equally continuously in its mold impressions.

This yields a number of advantages. In the deep-drawing, there is no relative movement between the forming vacuum device and the format plate. A virtually seal-tight system with no significant leakage losses is created. In addition to a reduced necessary suction capacity, the possibility of a more precise controlling of the vacuum management is obtained. The forming vacuum can be purposefully switched on after the end of the preheating time. Moreover, the possibility is obtained of applying a complex pressure profile. For instance, the film can firstly be sucked upward onto the heating plate of the forming station, which suction can be supported from below by compressed air.

According to requirement, it is also possible, however, to conduct a free, initially pressure-free heating and plasticization of the film. After the end of the heating time, in the forming station can then be applied an appropriate deep-drawing vacuum, which is able to be freely controlled in terms of its pattern. A constant deep-drawing vacuum, as well as a deep-drawing vacuum which is variable over time, is thus possible. As an option, the deep-drawing can further be supported by overpressure from the top side. Irrespective thereof, in the following holding vacuum channel is applied a suitable holding vacuum, which, depending on the pattern of the deep-drawing vacuum, is greater than, equal to or smaller than the latter. Following completion of the deep-drawing, the format plate enters in any event into connection with the holding vacuum channel and, due to the telescopic configuration of this same, is continuously subjected to the holding vacuum, to be precise already when leaving the retreating forming station. As a result of the fixed telescopic channel portion, it is possible to take over the holding volume from the moved telescopic channel portion and, in particular, to maintain this through to the following processing station, preferably at least through to the sealing station. In a preferred mechanical embodiment, the two interlocking telescopic channel portions have for this purpose an upwardly open side, wherein the above-situated format plates are connected via lower pressure openings to the open side of the telescopic channel portions. It is thereby ensured that a continuous, pressure-transmitting connection exists, so that an equally continuous, fluctuation-free holding vacuum on the deep-drawn film is able to be set.

The invention comes fully to bear in particular when the forming station is configured for deep-drawing the film web simultaneously into a plurality of successive format plates. To this end, the forming vacuum device includes a number of forming vacuum channels that corresponds to the number of format plates of a plate set, wherein the individual forming vacuum channels are connected to the individual format plates located in the forming station and are vacuumized independently of one another.

This solves the problem of transferring and relaying the format plates from the forming station. At the beginning of a cycle, the film is firstly thermally plasticized over the whole of the plate set. After this, the entire plate set is simultaneously subjected to the deep-drawing vacuum, whereby the plasticized film is deep-drawn into the mold impressions of all format plates of the plate set. In the subsequent return travel of the forming station, the individual format plates are now successively connected up to the jointly moved telescopic channel portion of the holding vacuum channel and hereby subjected to the holding vacuum. Now, new format plates of a following plate set are received however, likewise successively, by the returning forming station. Since at this point, however, a heating and plasticization of the film at this location has not yet been realized, the forming vacuum in the forming vacuum channels is switched off sequentially, that is, one after another and independently of one another. A premature suction of the still cold film into the mold impressions is hereby prevented, while, in those format plates which in the transitional phase with already deep-drawn film are still located in the returning forming station, the appropriate vacuum is maintained. Only once all previously processed format plates are in the region of the telescopic holding vacuum channel and a complete new set of format plates is connected up to the individual forming vacuum channels is the cycle of heating and deep-drawing realized anew.

All in all, a configuration according to the disclosure hence allows the simultaneous processing of a plurality of format plates in just one forming station, which, moreover, gives rise to the possibility of a simultaneous further treatment in following stations, such as in the filling station and the sealing station. As a result, the output can be multiplied without loss of quality.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
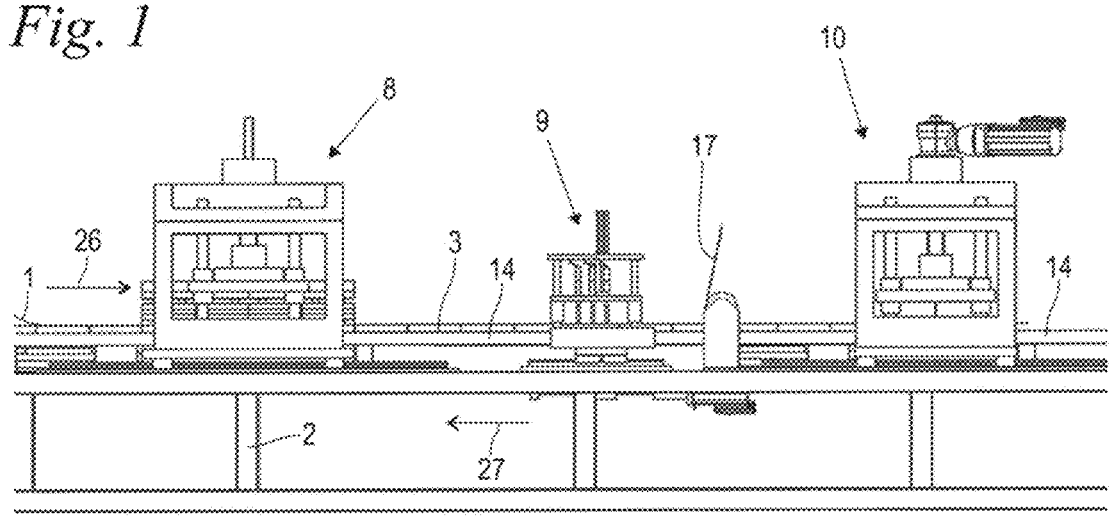
FIG. 1 shows in a lateral detailed representation a packaging machine constructed according to the disclosure, including a conveyor, which is moved in a continuously revolving motion, and including forming, filling and sealing stations, which are moved jointly in cycles.

FIG. 1 shows in a side view a detail from a packaging machine according to the disclosure for producing filled bags. To this end, the packaging machine includes a machine frame 2, a forming station 8, a filling station 9 and a sealing station 10. A film web 1 is fed to the packaging machine and deep-drawn in the forming station 8, so that cavities are formed in the film web 1. These cavities are filled with a product in the filling station 9. Following this, a cover film 17 is supplied and sealed in the sealing station 10 onto the film web 1, whereupon the filled cavities are closed off. In a cutting station (not represented), the thus formed film unit is separated into film bags. In the illustrative embodiment, the film web 1 and the cover film 17 are constituted by water-soluble films, especially PVOH films, between which is packed a detergent or cleaning agent. Filled film bags which are produced in this way are placed, for instance, into a dishwasher. There the film material dissolves upon contact with water and releases the contained rinsing agent. Analogously, the same applies to the use of such a film bag in a washing machine.

Figure 2:
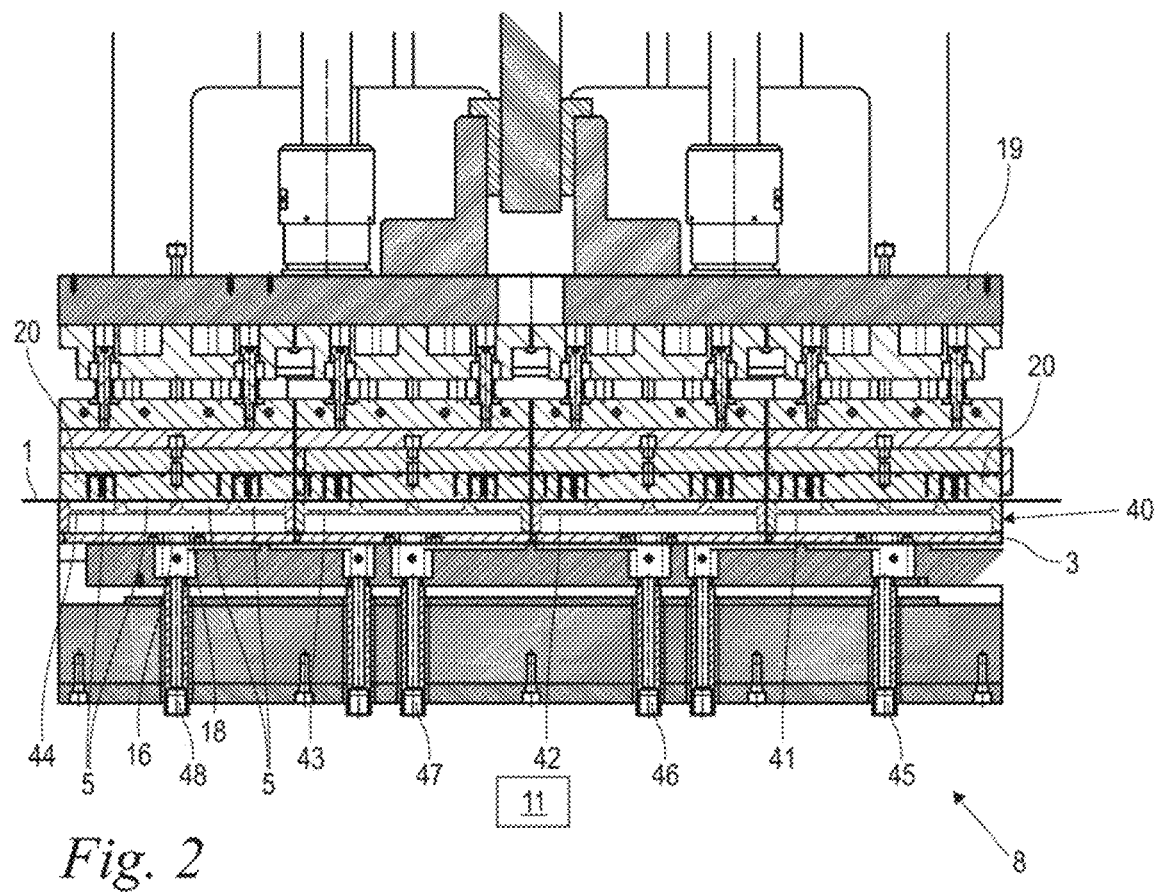
FIG. 2 shows in an enlarged sectional representation the forming station according to FIG. 1, including a plurality of simultaneously received format plates and a plurality of associated forming vacuum channels in the deep-drawing process.
Figure 3:
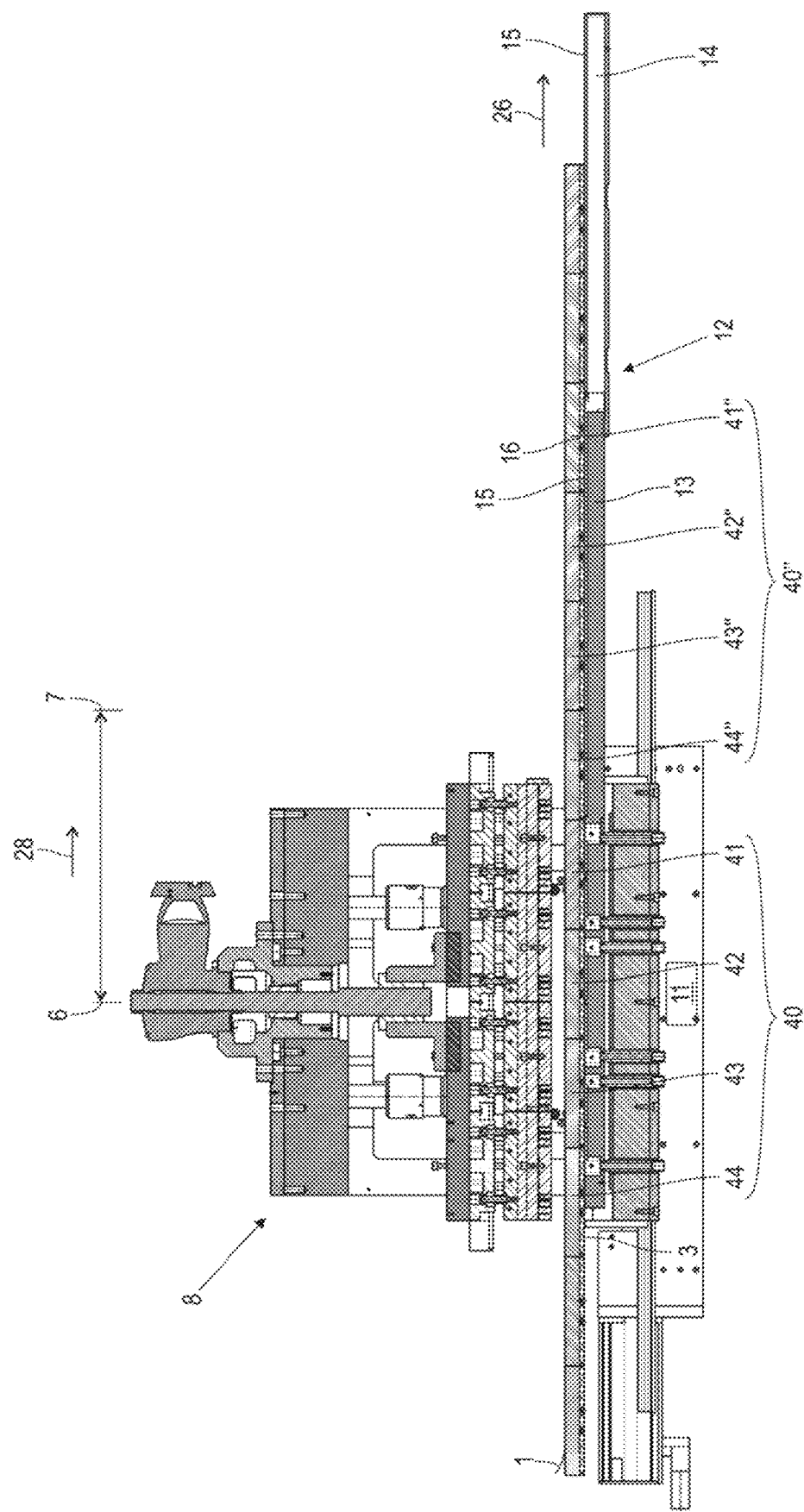
FIG. 3 shows in a sectional representation the deep-drawing apparatus according to FIG. 1 including the forming station according to FIG. 2 at the beginning of a processing cycle, in the course of the synchronization with the continuously moved format plates.
Figure 4:
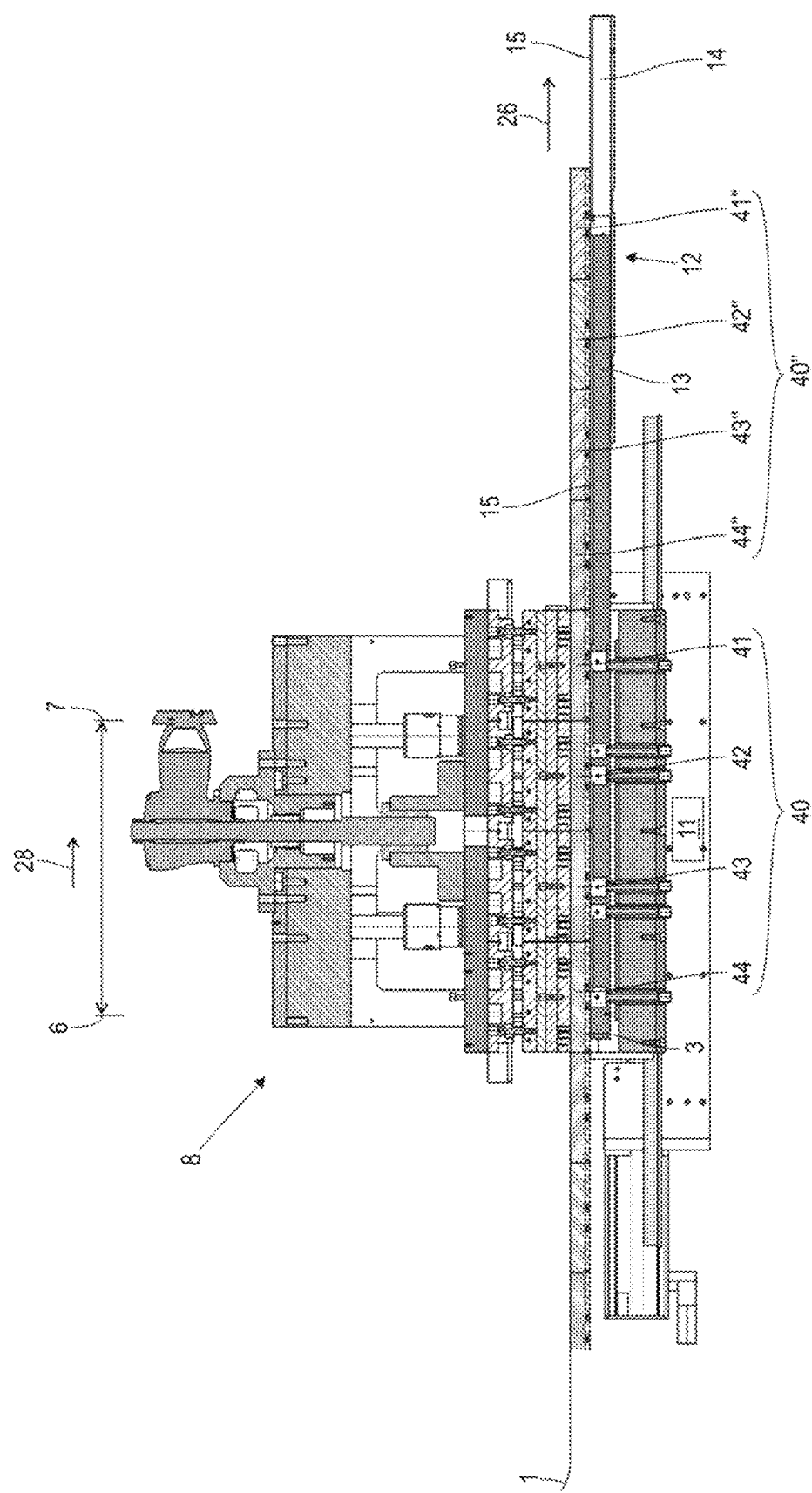
FIG. 4 shows the arrangement according to FIG. 3 in the course of the deep-drawing, during the continuous forward movement of the format plates.

The packaging machine includes a statically mounted machine frame 2 and a continuously driven conveyor 3. The conveyor 3 can be a conveyor belt or the like and, in the shown illustrative embodiment, is formed by elements which are connected to one another in an articulated and chain-like manner and on which are mounted format plates 41, 42, 43, 44 described in greater detail further below (FIG. 2). These latter are driven together with the conveyor 3 continuously and such that they revolve around the machine frame 2, wherein, for the actual bag production process, they move on an upper horizontal track in accordance with an arrow 26 and, after appropriate deflection, are subsequently led back, in the lower region of the machine frame 2, in accordance with an arrow 27. Equally continuously, the endless film web 1 is supplied and placed from above onto the conveyor 3 having the format plates 41, 42, 43, 44 (FIG. 2). Between the filling station 9 and the sealing station 10, the cover film 17 is later still continuously supplied and placed from above onto the top side of the film web 1. In the placed-on state, the film web 1 and the cover film 17 are synchronously and continuously moved along with the conveyor 3 in accordance with the arrow 26.

The station for supplying the film web 1 and the station for supplying the cover film 17 are statically mounted on the machine frame 2, as are stations (not represented) for the application of water in order to promote the sealing process, and also stations for the perforation or lateral trimming of the films. The processes which are here conducted work continuously, just like the movement of the conveyor 3. This appears different in the case of the forming station 8, the filling station 9 and the sealing station 10. They are not positioned statically relative to the machine frame 2, but are in some sections jointly transported over a certain distance synchronously with the conveyor 3. Meanwhile, in the forming station 8 the film web 1 is deep-drawn, in the filling station 9 the product to be packed is poured into the deep-drawn cavities, and in the sealing station 10 the cover film 17 is sealed onto the lower film web 1. After completion of the respective process, the forming station 8, the filling station 9 and the sealing station 10 are cyclically transported back again to their initial position, where a new cycle of the respectively conducted process begins.

FIG. 2 shows in an enlarged longitudinal sectional representation a detail from the forming station 8 according to FIG. 1. The forming station 8 can be configured to receive just a single format plate 41 and to there deep-draw the film web 1 in one cycle. In the shown illustrative embodiment, the forming station 8 is configured to simultaneously receive a plurality of, here four, successive format plates 41, 42, 43, 44. The four successive format plates 41, 42, 43, 44 together form a plate set 40, wherein the forming station 8 cyclically always receives a complete plate set 40. This does not necessarily have to apply also to the following filling and sealing stations 9, 10 (FIG. 1). In the shown illustrative embodiment according to FIG. 1, the filling station 9 and the sealing station 10 are, however, also configured for the cyclical processing of a complete plate set 40.

The individual format plates 41, 42, 43, 44 have on their top side respectively a number of (schematically indicated) mold impressions 5 and are provided on their opposite bottom side with a pressure chamber 18. The pressure chambers 18 of the individual format plates 41, 42, 43, 44 are mutually separated, so that no automatic pressure equalization takes place between them. Nevertheless, a pressure-transmitting connection between the pressure chambers 18 and the mold impressions 5 prevails within each individual format plate 41, 42, 43, 44 by way of capillary bores (not represented), so that the individual mold impressions 5, via the pressure chambers 18, can be subjected to underpressure or overpressure, as desired. The subjection to underpressure or vacuum pressure occurs via forming vacuum channels 45, 46, 47, 48 as part of an (only schematically indicated) forming vacuum device 11. The forming vacuum device 11, inclusive of its forming vacuum channels 45, 46, 47, 48, is part of the cyclically sequenced forming station 8 and is moved jointly therewith. The individual pressure chambers 18 hereupon enter into pressure-transmitting connection with the forming vacuum device 11 and, via the individual forming vacuum channels 45, 46, 47, 48, can be subjected, independently of one another, to underpressure, in particular to a forming vacuum, which continues through into the respective mold impressions 5.

In the state according to FIG. 2, the film web 1 rests on the top side of the format plates 41, 42, 43, 44 and is pressed down from above via a pressure plate 19. Via the pressure plate 19, heating plates 20 are transported from above up to the film web 1. In support, a vacuum can be desired applied from above, via which vacuum the film web 1 is firstly sucked upward toward the heating plates 20. For further support, an overpressure can also be introduced from below into the pressure chambers 18. In any event, at this point there is still no underpressure or vacuum present in the pressure chambers 18.

In the manner described above, the film web 1 is firstly heated in the forming station 8 via the heating plates 20, to the point where a plasticization or plastic deformability sets in. The forming vacuum device 11 now provides, for the upcoming deep-drawing process, a suitable forming vacuum. As soon as the desired target temperature of the film web 1 is reached, the mold impressions 5 are subjected via the pressure chambers 18 and the forming vacuum channels 45, 46, 47, 48 of the forming vacuum device 11 to this forming vacuum, which deep-draws the film web 1 into the mold impressions 5. A certain forming vacuum of a predefined constant magnitude can herein be applied. However, it can also be expedient to feed in a specific temporal progression of the intensity of the forming vacuum. This also includes the possibility, after completed deep-drawing, of lowering the forming vacuum to a lower holding vacuum in the forming vacuum device 11, and hence in the mold impressions 5. As an option, a supporting overpressure, moreover, can be applied from above to the top side of the film web 1. All this is possible because, during the deep-drawing cycle, the forming station 8 is moved jointly in synchronization with the plate set 40 or with the conveyor 3, that is, no relative movement takes place.

FIGS. 3 to 6 show in a sectioned side view a deep-drawing apparatus, constructed according to the disclosure, of the packaging machine according to FIG. 1 including the forming station 8 according to FIG. 2. For better clarity, only the forming station 8 and a portion of the conveyor 3 with some format plates 41, 42, 43, 44 are here represented. The same arrangement is here represented in different phases of the method. According to FIG. 3, the mobile forming station 8 is in an initial start position 6, while the conveyor 3 with the format plates 41, 42, 43, 44 and with the lay-on film web 1 is moved continuously forward according to the arrow 26. Starting from the start position 6, a synchronization of the movement of the forming station 8 with the continuous movement of the approaching plate set 40 is conducted, which plate set, according to FIG. 3, has not yet quite fully entered into the forming station 8. As soon as this has happened, however, the forming station 8, starting from its start position 6, is moved jointly in synchronization with the received plate set 40, in the direction of an arrow 28, up to an end position 7.

As soon as the synchronization has been realized and the plate set 40 has assumed its intended relative position to the forming station 8, the upper portion of the forming station 8 with pressure plate 19 and heating plate 20 is lowered onto the film web 1, as is shown in FIG. 2. Via locating pins or other suitable means, an exact positional alignment relative to the received format plates 41, 42, 43, 44 is realized. According to FIG. 4, the forming station 8, starting from the start position 6, moves jointly with the received plate set 40 up to the end position 7. During the joint movement, the deep-drawing of the film web 1, as described in association with FIG. 2, is realized. A plate set 40" including format plates 41", 42", 43", 44", which has previously already been processed in the forming station 8, moves from the described arrangement and, via a holding vacuum channel 12 described in greater detail further below, is subjected to a holding vacuum.

Figure 5:
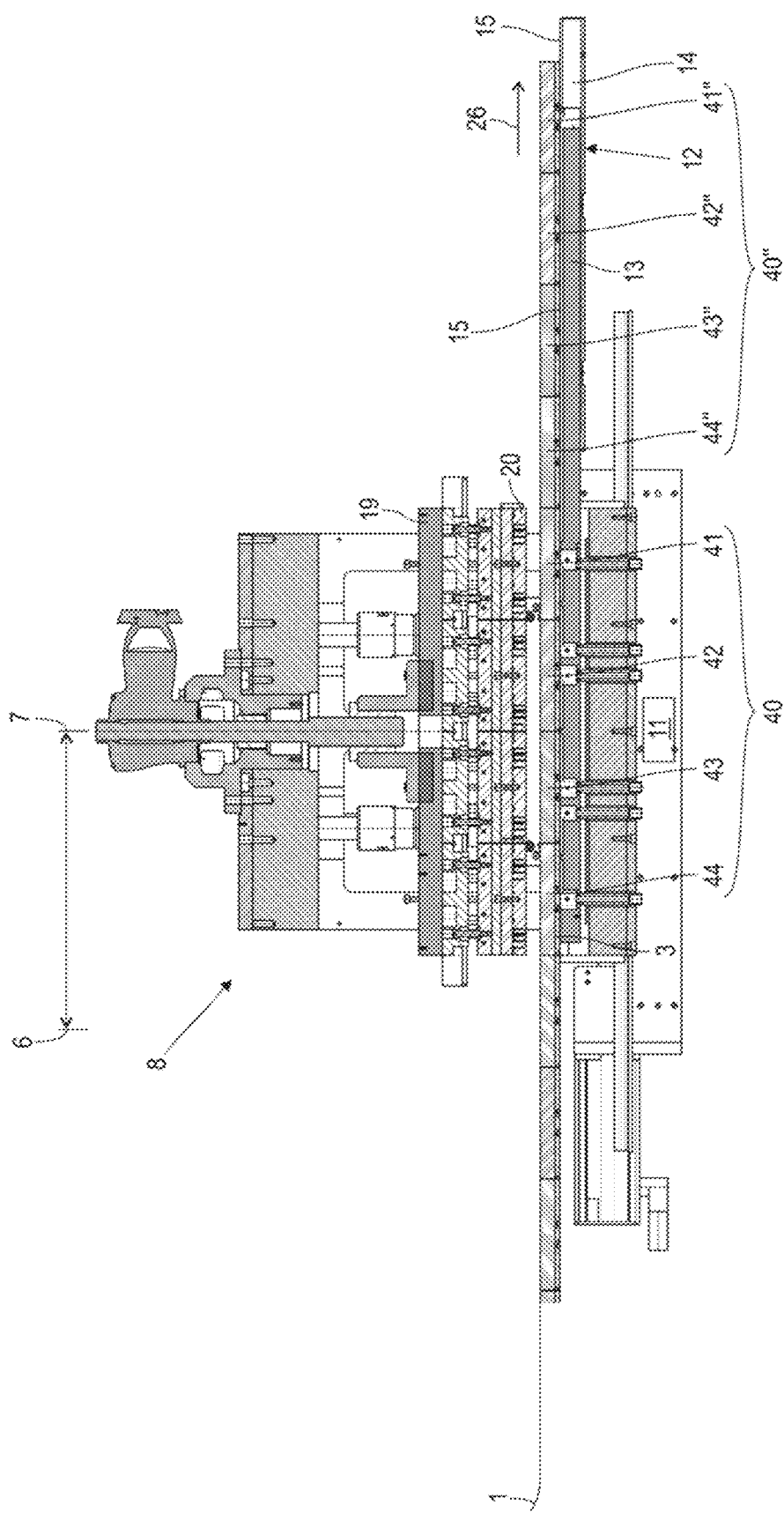
FIG. 5 shows the arrangement according to FIGS. 3 and 4, including the forming station in end position, with continuously advanced format plates; and, FIG. 6 shows the arrangement according to FIGS. 3 to 5 in the course of the return travel of the forming station and transfer of the previously processed format plates to a telescopic holding vacuum channel.

The reaching of the end position 7 is shown in FIG. 5, wherein here the deep-drawing process is concluded. The upper portion of the forming station 8, inclusive of the pressure plate 19 and the heating plates 20, is now raised. The forward movement of the forming station 8 ends here, while the plate set 40, with the film web 1 deep-drawn therein, moves on further in the direction of the arrow 26.

Figure 6:
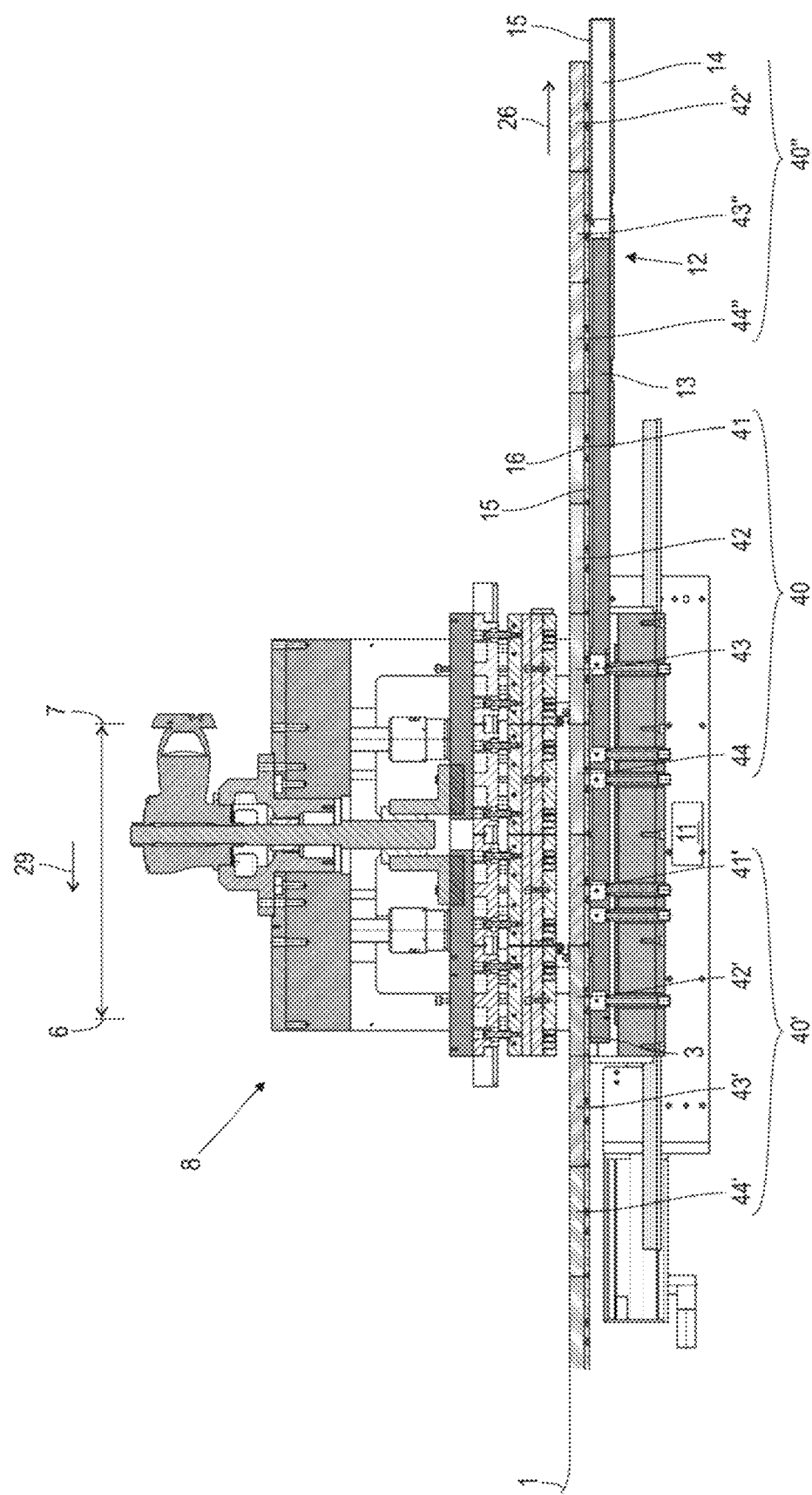

Starting herefrom, the forming station 8 is now transported back to the start position 6 in accordance with an arrow 29, as is represented in FIG. 6. Meanwhile, the conveyor 3, with the previously processed plate set 40, is continuously moved further in the direction of the arrow 26. At the same time, a following plate set 40' with format plates 41', 42', 43', 44' enters into the forming station 8, and a new cycle, beginning with the synchronization, is realized according to FIG. 3.

From the synopsis of FIGS. 3 to 6, a further particularity of the disclosure, namely the presence and configuration of the aforementioned holding vacuum channel 12 arranged downstream of the forming vacuum device 11, is obtained. The holding vacuum channel 12 includes a first telescopic channel portion 13 and a second telescopic channel portion 14. Both telescopic channel portions 13, 14 interlock telescopically, wherein the first telescopic channel portion 13 is part of the cyclically moved forming station 8 and is moved cyclically back and forth with this same. The second telescopic channel portion 14 is statically mounted on the machine frame 2 (represented only in FIG. 1). From the phase images of FIGS. 3 to 6, it is evident that the first, mobile telescopic channel portion 13, according to the position of the forming station 8, engages more or less deeply in the second, static telescopic channel portion 14. Irrespective of the depth of engagement, both telescopic channel portions 13, 14 are constantly in pressure-transmitting connection with each other, so that they permanently have the same pressure level in the form of a holding vacuum. Moreover, both telescopic channel portions 13, 14 have an upwardly open side 15, through which the above-situated format plates, through their facing lower pressure openings 16, are subjected to the holding vacuum.

The function of the telescopic holding vacuum channel 12 is here, in the various phases of FIGS. 3 to 6, as follows: During the deep-drawing of the film web 1 into a plate set 40 according to FIGS. 4 and 5, a plate set 40" which has previously been processed in the same way is located above the holding vacuum channel 12, wherein the associated mold impressions 5 (FIG. 2), with the film web 1 deep-drawn therein, are subjected to a holding vacuum through the lower pressure openings 16 and the thereto adjoining open side 15. During their continuous forward movement, the associated format plates 41", 42", 43", 44" are firstly connected to the first telescopic channel portion 13 and then to the fixed, second telescopic channel portion 14. According to FIG. 1, the second, static telescopic channel portion 14 extends at least up to and including the sealing station 10, so that, at least up to here and during the sealing process, the deep-drawn film web 1 is held in its mold impressions 5 via the applied holding vacuum (FIG. 2).

As soon as, starting herefrom, the forming station 8 according to FIG. 6 is now transported rearward, the format plates 41, 42, 43, 44 of the plate set 40 which have just been processed in the forming station gradually advance to the first, jointly moved telescopic channel portion 13, and from there to the second, static telescopic channel portion 14.

Firstly, the first format plate 41 moves from its assigned forming vacuum channel 45 (FIG. 2) to the first, jointly moved telescopic channel portion 13 and enters into vacuum connection with the latter. It later advances to the second, static telescopic channel portion 14, wherein, due to the telescopic configuration thereof, the holding vacuum is maintained. The directly following format plate 42 firstly leaves its assigned forming vacuum channel 46 (FIG. 2) and then sweeps over the front forming vacuum channel 45, via which, furthermore, a vacuum is maintained in its mold impressions 5 (FIG. 2). After this, the second format plate 45 too reaches the main vacuum channel 12. Analogously, the same applies to the other format plates 43, 44 of the same plate set 40: they firstly leave their assigned forming vacuum channels 47, 48 and then sweep one after another over the forming vacuum channels 47, 46, 45, via which a vacuum continues to be maintained in their mold impressions 5 (FIG. 2). Finally, the rearmost format plate 44 too reaches the main vacuum channel 12, and, via this, is supplied with holding vacuum.

According to FIG. 6, the departing plate set 40 is now followed by a following plate set 40' including format plates 41', 42', 43', 44' and enters into the forming station 8. Synchronously with the entry, the previously prevailing vacuums in the forming vacuum channels 48, 47, 46, 45 are respectively switched off one after another, that is, sequentially and independently of one another, to be precise beginning with the forming vacuum channel 48 and ending with the forming vacuum channel 45, in such a way that the format plates 41, 42, 43, 44 with deep-drawn film web 1 continue to remain vacuumized, while subsequently entering format plates 41', 42', 43', 44', with not yet deep-drawn film web 1, sequentially assume the position of their predecessors, that is, the format plates 41, 42, 43, 44, without at this point, however, undergoing a vacuumization. The sequential switching-off causes the film web 1, which at this point has not yet been heated or not yet been deep-drawn, to be sucked prematurely into the mold impressions. The renewed vacuumization is realized only after conclusion of the renewed synchronization and heating according to FIGS. 3 and 4.

It is understood that the foregoing description is that of the preferred embodiments of the invention and that various changes and modifications may be made thereto without departing from the spirit and scope of the invention as defined in the appended claims.

What is claimed is:

1. A deep-drawing apparatus for deep-drawing a continuously fed film web, the deep-drawing apparatus comprising:
a conveyor configured to revolve continuously around a fixed machine frame;
said conveyor including a plurality of format plates;
said plurality of format plates having a number of mold impressions formed therein;
a cyclically sequenced forming station, which runs along with said conveyor from a start position to an end position and runs back from said end position to said start position;
a forming vacuum device;
a holding vacuum channel;
individual ones of said plurality of format plates being able to be sequentially connected first to said forming vacuum device and then with said holding vacuum channel;
said forming vacuum device being part of said cyclically sequenced forming station;

said holding vacuum channel having two interlocking telescopic channel portions including a first telescopic channel portion and a second telescopic channel portion;

said first telescopic channel portion being part of said cyclically sequenced forming station; and, said second telescopic channel portion being mounted statically relative to the fixed machine frame.

2. The deep-drawing apparatus of claim 1, wherein said forming station is configured to deep-draw the film web simultaneously into a plurality of successive format plates of a plate set; and, said forming vacuum device includes a number of forming vacuum channels that corresponds to a number of said format plates of a plate set, individual ones of said forming vacuum channels being connected to individual ones of said format plates located in said forming station and being able to have a vacuum applied thereto independently of one another.

3. The deep-drawing apparatus of claim 1, wherein said first interlocking telescopic channel portion and said second interlocking telescopic channel portion have an upwardly open side; and, said format plates disposed above said open side being connected via lower pressure openings to said open side of said first and second telescopic channel portions.

4. The deep-drawing apparatus of claim 1, wherein said forming vacuum device and said holding vacuum channel can be subjected to a different vacuum level.

5. A packaging machine for producing filled bags, the packaging machine comprising:

a deep-drawing apparatus for deep-drawing a continuously fed film web;

said deep-drawing apparatus including a conveyor, a cyclically sequenced forming station, a forming vacuum device, and a holding vacuum channel;

said conveyor configured to revolve continuously around a fixed machine frame;

said conveyor including a plurality of format plates;

said format plates having mold impressions formed therein;

said cyclically sequenced forming station running along with said conveyor from a start position to an end position and running back from said end position to said start position;

individual ones of said plurality of format plates being able to be sequentially connected first to said forming vacuum device and then to said holding vacuum channel;

said forming vacuum device being part of said cyclically sequenced forming station;

said holding vacuum channel includes a first telescopic channel portion and a second telescopic channel portion;

said first telescopic channel portion being part of said cyclically sequenced forming station;

said second telescopic channel portion being mounted statically relative to the fixed machine frame; and, a subsequent processing station.

6. The packaging machine of claim 5, wherein said second telescopic channel portion extends up to said subsequent processing station which follows said forming station.

7. The packaging machine of claim 6, wherein said subsequent processing stations following said deep-drawing apparatus includes a filling station and a sealing station; and, wherein said second telescopic channel portion extends at least up to said sealing station.

* * * * *